United States Patent
Wolff et al.

(10) Patent No.: US 9,620,843 B2
(45) Date of Patent: Apr. 11, 2017

(54) DISPLAY PANEL FOR FRONT-SIDE WIRELESS COMMUNICATION

(71) Applicant: HEWLETT-PACKARD DEVELOPMENT COMPANY, LP, Fort Collins, CO (US)

(72) Inventors: Stacy L Wolff, Houston, TX (US); Michael Delpier, Houston, TX (US); Kevin L Massaro, Houston, TX (US); Ming-Jen Yu, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 13/756,354

(22) Filed: Jan. 31, 2013

(65) Prior Publication Data
US 2014/0213178 A1    Jul. 31, 2014

(51) Int. Cl.
| | | |
|---|---|---|
| *H04B 5/00* | (2006.01) |
| *H01P 11/00* | (2006.01) |
| *H01Q 1/24* | (2006.01) |
| *H01Q 1/36* | (2006.01) |
| *H01Q 1/38* | (2006.01) |
| *H01Q 7/00* | (2006.01) |

(52) U.S. Cl.
CPC ............ *H01P 11/00* (2013.01); *H01Q 1/243* (2013.01); *H01Q 1/36* (2013.01); *H01Q 1/38* (2013.01); *H01Q 7/00* (2013.01); *H04B 5/0031* (2013.01); *H04B 5/0081* (2013.01); *Y10T 29/49016* (2015.01)

(58) Field of Classification Search
CPC ..... H01P 11/00; H04B 5/0031; H04B 5/0081; Y10T 29/49016
USPC ....................................................... 455/41.2
See application file for complete search history.

(56) References Cited

U.S. PATENT DOCUMENTS

| 7,973,722 B1 | 7/2011 | Hill et al. |
| 2005/0178835 A1* | 8/2005 | Akiho ................. G06K 7/0008 235/451 |
| 2008/0278384 A1* | 11/2008 | Shimasaki et al. ........... 343/702 |
| 2010/0321312 A1* | 12/2010 | Han ...................... G06F 1/1694 345/173 |

* cited by examiner

*Primary Examiner* — Yuwen Pan
*Assistant Examiner* — Fatuma Sherif
(74) *Attorney, Agent, or Firm* — HP Patent Department

(57) ABSTRACT

An example provides an apparatus including a display panel, a shielding layer including an opening adjacent to a back side of the display panel, and an antenna overlapping the opening to allow for wireless communication with the apparatus from a front side of the display panel.

17 Claims, 8 Drawing Sheets

DISPLAY PANEL FOR FRONT-SIDE WIRELESS COMMUNICATION

BACKGROUND

Computing devices are sometimes configured with wireless communication capability. Smart phones and tablet computers, for example, may include a near field communication (NFC) antenna for establishing radio communication with another NFC-enabled device. To establish the radio communication, the areas of the devices having the NFC antenna rascally must touch or be brought into close proximity.

BRIEF DESCRIPTION OF THE DRAWINGS

The detailed description section references the drawings, wherein.

DETAILED DESCRIPTION OF EMBODIMENTS

Computing devices are commonly configured for wireless communication. Near field communication (NFC)-enabled computing devices, for example, are becoming increasingly common. NFC may allow devices to share data much more quickly than other data-sharing methods. For portable computing devices, such as smart phones and tablet computers, for example, NFC may he particularly desirable as conventional data-sharing methods may be less convenient for these devices.

For many devices, the NFC antenna is commonly located in an area of device that subjects the NFC antenna to the least amount of electrical interference from the other components of the device. For example, devices may include the NFC antenna just within the back panel of the housing. In this configuration, radio communication between devices may be established by touching the back sides of the devices or by bringing the back sides of devices into close proximity (commonly within several centimeters).

Described herein are embodiments of apparatuses and systems including a display panel, a shielding layer including an opening adjacent to a back side of the display panel, and an antenna overlapping the opening to allow for wireless communication with the apparatus from a front side of the display panel, and methods for making the same.

Figure 1A:
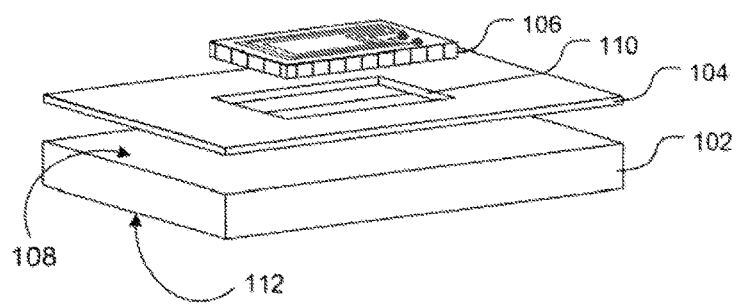
FIGS. 1A-1C show an example apparatus for front-side wireless communication, in accordance with various implementations.
Figure 1B:
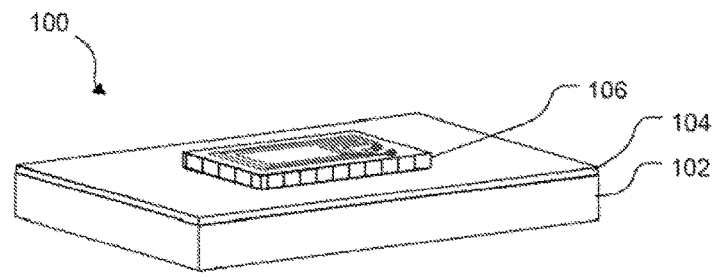
Figure 1C:
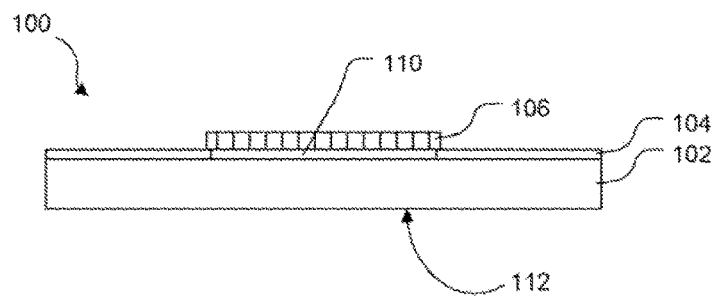

An example apparatus 100 including a display panel 102, a shielding layer 104, and an antenna 106, in accordance with various embodiments, is shown in FIGS. 1A-1C. The shielding layer 104 may be adjacent to a back side 108 of the display panel 102 and may have an opening 110. The antenna 106 may be an antenna for wireless communication that overlaps the opening 110 such that the antenna 10$ is adjacent to the back side 108 of the display panel 102, as shown, to allow for wireless communication from a front side 112 of the display panel 102.

The apparatus 100 may be a stand-alone device or may be incorporated into any apparatus including a display. Examples of apparatuses may include, but are not limited to, desktop computers, notebook computers, handheld computers, tablet computers, netbook computers, convertible computers, display devices, servers, set-top boxes, digital recorders, game consoles, smart phones, personal digital assistants, mobile phones, digital media players, televisions, or digital cameras.

The shielding layer 104 may be configured to shield the display panel 102 from interference an electrical component(s) that may be disposed behind the display panel 102, or to shield the other electrical component(s) from interference from the display panel 102, or both. The shielding layer 104 may comprise any suitable material for providing electromagnetic shielding such as, for example, metal sheets or foils, or metallic ink or coating. In some examples, the shielding layer 104 may comprise stainless steel or aluminum. In some examples, the shielding layer 104 may comprise a metal screen or mesh having a number of small holes sized to shield radiation, in some examples, the shielding layer 104 may be fixed to the back-side 112 of the display panel 102 by an adhesive or other material for bonding the shielding layer 104 to the display panel 102. In other examples, the shielding layer 104 may be unfixed to the back-side 112 or may fixed to the display panel 102 along one or more edges of the display panel 102 (by a frame, for example). In some examples, the shielding layer 104 may be fixed to an electrical component (such as, e.g., system circuit board) behind the display panel 102 (not illustrated) such that the shielding layer 104 is between the display panel 102 and the electrical component.

In various examples, the antenna 106 may provide, at least in part, the shielding benefit provided by the shielding layer 104. Accordingly, any impact on the interference shielding provided by the shielding layer 104 may be avoided or minimized by the antenna 106 itself in various ones of these examples, the apparatus 100 may omit another shielding layer behind the antenna 106. In other examples, another shielding layer may be provided behind the antenna 106 (not illustrated).

In various examples, the antenna 106 is NFC antenna. In some other examples, the antenna 106 is antenna for short range or long range communication. In some examples, the antenna 106 is an antenna for providing wireless communication in accordance with systems such as, but not limited to, wide area, local area or personal area, network systems. In some examples, the antenna 106 is an antenna for communication using at least one protocol selected from a set of protocols including, but not limited to, Bluetooth, radio frequency identification (RFD), infrared and other wireless communication mediums.

As shown in FIGS. 1A-1C, the antenna 106 has a size that is larger than the size of the opening 110, at least along one dimension (e.g., length or width). In this example, the antenna 106 essentially sits atop the shielding layer 104 such that the shielding layer 104 is disposed between the antenna 106 and the display panel 102. In various ones of these examples, the opening 110 may have a size respective to the size of the antenna 106 to allow for wireless communication from the front side 112 of the display panel 102. In some examples, the opening 110 may have a size such that no more than 50% of the antenna 106 is obscured by the shielding layer 104.

The display panel 102 may comprise any one of a number of types of display panels. Examples may include, but are not limited to, liquid crystal displays, light emitting diode displays. organic light emitting diode displays, or active-matrix organic light emitting diode displays. The display panel 102 may be a capacitive or resistive touch screen display panel or another type of touch screen display panel.

Figure 2A:
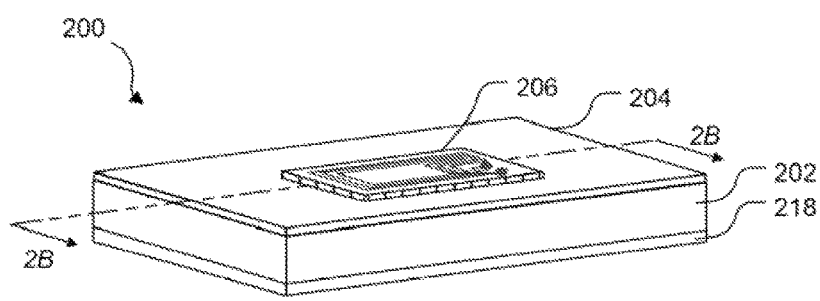
FIGS. 2A and 2B show another example apparatus for front-side wireless communication, in accordance with various implementations.
Figure 2B:
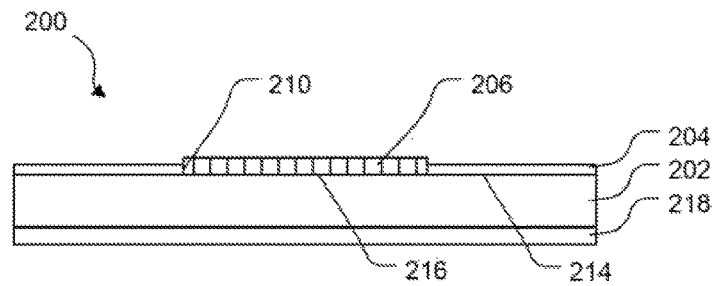

FIGS. 2A and 2B show another example apparatus 200 including a display panel 202, a Shielding layer 204, and an antenna 206, in accordance with various embodiments. As shown, the shielding layer 204 may be adjacent to a first portion 214 of the backside of the display panel 202, and the antenna 206 may be adjacent to a second portion 216 of the back side of the display panel 20 in some of these examples and as shown, the opening 210 of the shielding layer 204 may be sized such that the antenna 206 fits within the opening 210.

In various examples, a touch sensor panel 218 may be adjacent to a front side of the display panel 202, as shown, to provide touch screen capability to the display panel 202. The touch sensor panel 218 may be a capacitive or resistive touch sensor panel or another type of touch sensor panel. In other examples, touch screen capability may be built into the display panel 202. For example, the display panel 202 may itself include a touch sensor pattern.

Figure 3A:
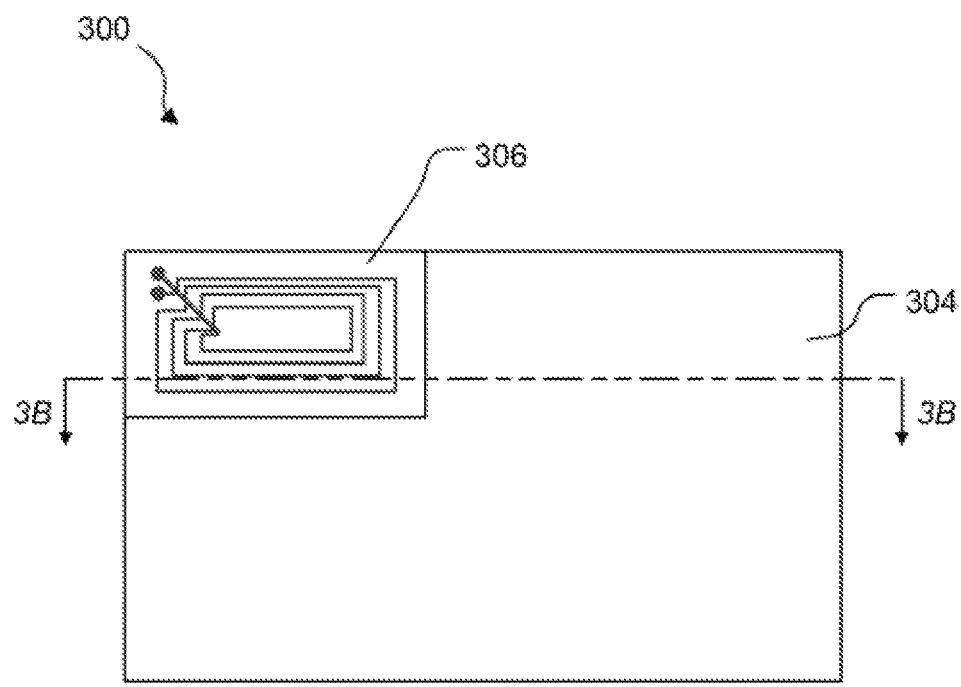
FIGS. 3A and 3B show another example apparatus for front-side wireless communication, in accordance with various implementations.
Figure 3B:
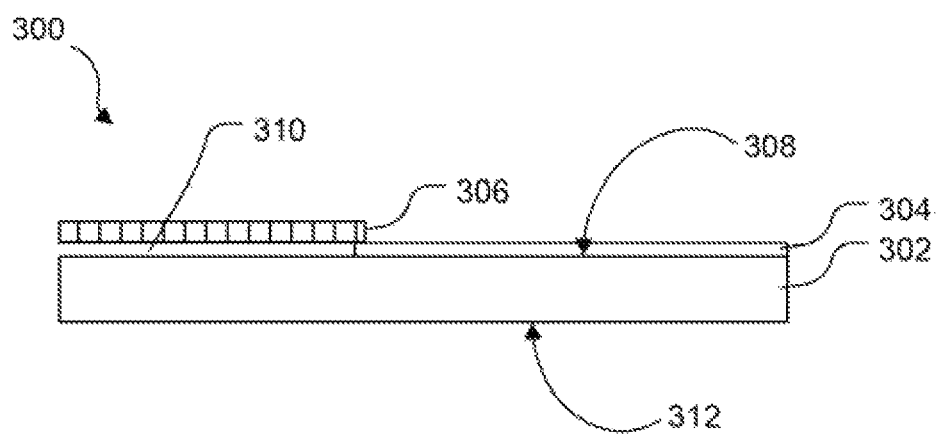

As shown in FIGS. 2A and 2B, the antenna 206 is disposed adjacent to the second portion 216 of the back side of the display panel 202 in which the second portion 216 is disposed within a periphery of the shielding layer 204 and the display panel 202, as shown. In other examples, the second portion 216 could be along an edge of the display panel 202, as shown in FIGS. 3A and 3B. As shown, the example apparatus 300 includes an antenna 306 is located adjacent to a back side 308 of the display panel 302 along at least one edge of the display panel 302. The shielding layer 304 may include an opening 310 having an opening along an edge of the shielding layer 304 to allow for wireless communication from a front side 312 of the display panel 302. Although the antenna 306 is shown as not extending beyond an edge of the display panel 302, in other examples, the antenna 306 may extend past the edge of the display panel 302 (not shown).

Figure 4:
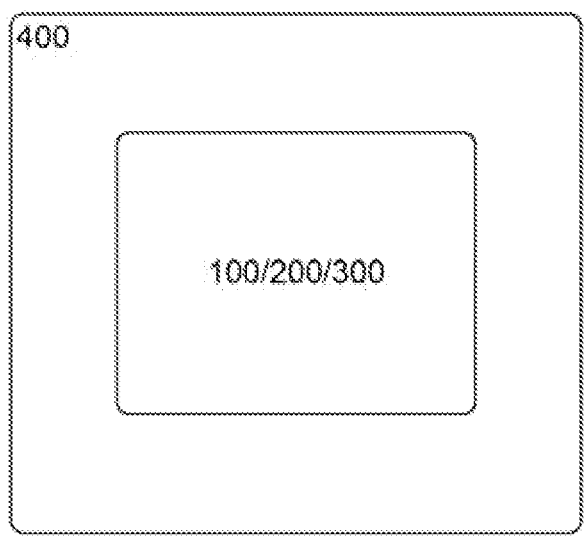
FIG. 4 shows an example computing system for front-side wireless communication, in accordance with various implementations.

Apparatuses 100, 200, or 300 described herein with reference to FIGS. 1A-1C, FIGS. 2A-2B, or FIGS. 3A-3B, respectively, may be incorporated into various types of systems such as system 400 shown in FIG. 4. As described herein, the apparatus 100/200/300 may include a display panel, a shielding layer, and an antenna. The shielding layer may he adjacent to a back side of the display panel and may have an opening. The antenna may be an NFC antenna that overlaps the opening such that the antenna is adjacent to the back side of the display panel to allow for wireless communication from a front side of the display panel.

The system 400 may be any system including a display such as, but not limited to, a desktop computer, a notebook computer, a handheld computer, a tablet computer, a netbook computer, a convertible computer, a display device, a server, a set-top box, digital recorder, a game console, a smart phone, a personal digital assistant, a mobile phone, a digital media player, a television or a digital camera.

Figure 5:
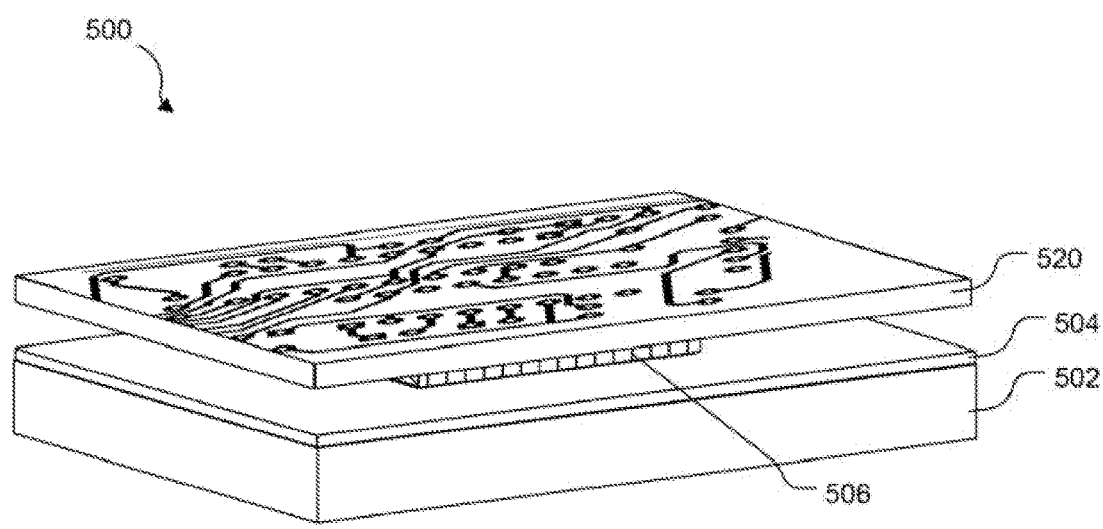
FIG. 5 shows another example computing system for front-side wireless communication, in accordance with various implementations.

In some example systems, circuitry may be provided for controlling various aspects of the system, FIG. 5 shows an example system 500 including a display panel 502, a shielding layer 504, and an antenna 506, in accordance with various embodiments. The shielding layer 504 may be adjacent to a back side of the display panel 502 and may have an opening (not shown). The antenna 506 may be an NFC antenna that overlaps the opening in the shielding layer 504 such that the antenna 506 is adjacent to the back side 508 of the display panel 502 to allow for wireless communication from a front side of the display panel 502.

As shown, the system 500 includes a system circuit board 520, the antenna 506 disposed between the system circuit board 520 and the display panel 502. In various examples, the system circuit board 520 may be a motherboard for the system 500. In other examples, the system circuit board 520 may he a touch screen controller to control the display panel 502. In various examples, the system circuit board 520 may be, for example, a printed circuit board, a flexible circuit, or another circuit substrate for mechanically supporting and/or electrically connecting electronic components by conductive pathways.

In various examples, the shielding layer 504 may be configured to shield the display panel 502 from interference from the system circuit board 520 or to shield the system circuit board 520 from the display panel 520, or both. While providing an opening in the shielding layer 504 may ordinarily run counter to shielding function, in various examples the antenna 506 may provide shielding to avoid or minimize any impact of the opening in the shielding layer 504.

Figure 6A:
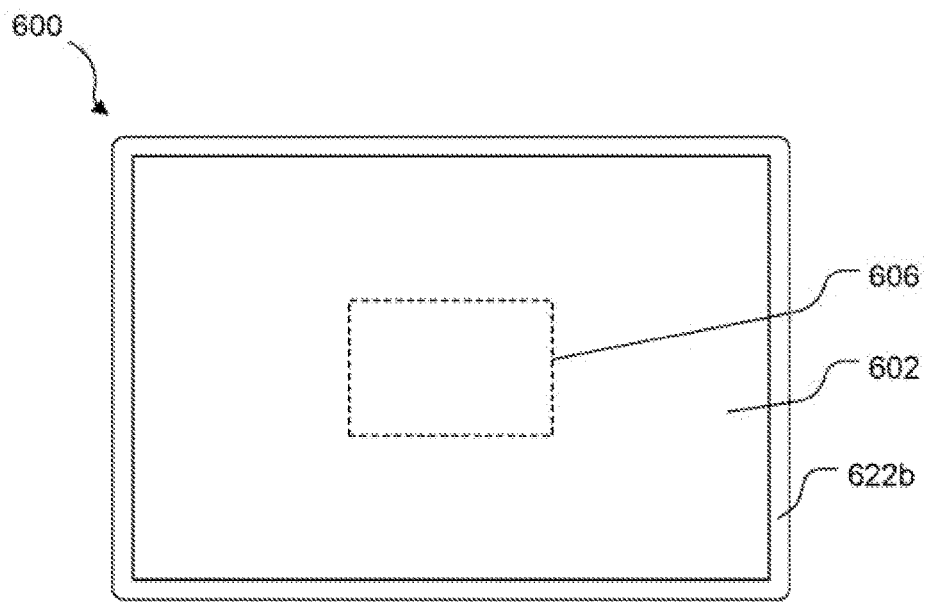
FIGS. 6A and 6B show another example computing system for front side wireless communication, in accordance with various implementations
Figure 6B:
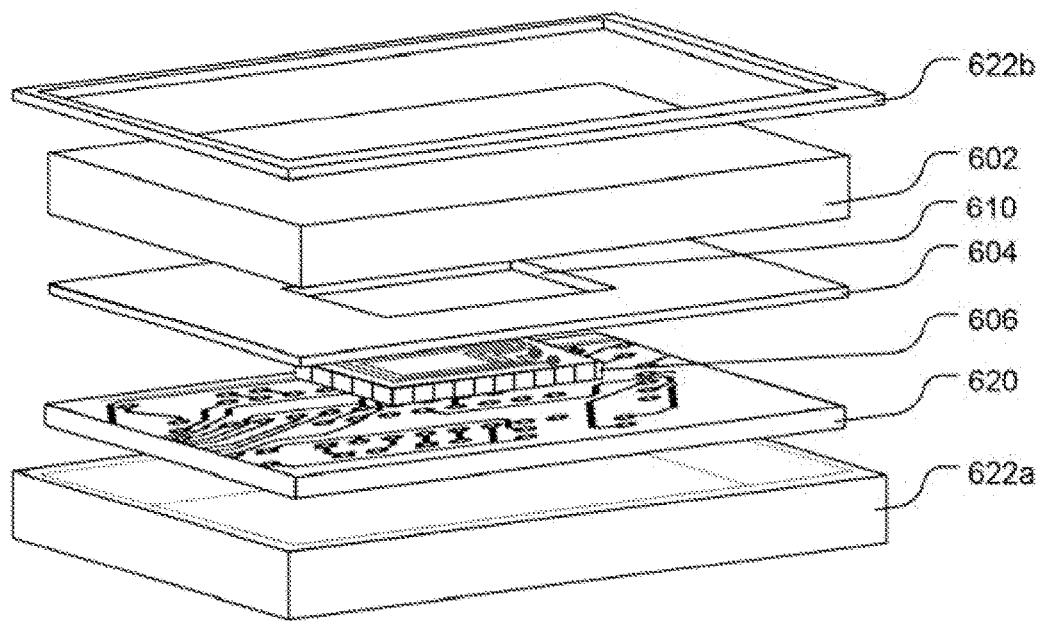

FIGS. 6A-6B show an example system 600 including a display panel 602, a shielding layer 604 with an opening 610, an antenna 606, and a system circuit board 620, in accordance with various embodiments. The system 600 further includes a housing 622a, 622b that houses the system circuit board 620, antenna 606, shielding layer 604, and display panel 602.

As shown, the system 600 may be a tablet computer, a smart phone, a display device, a television, or other device. In other examples, the system 600 may be any system including a display such as, but not limited to, a desktop computer, a notebook computer, a handheld computer, a netbook computer, a convertible computer, a server, a set-top box, a digital recorder, a game console, a personal digital assistant, a mobile, phone, a digital media player, a television, or a digital camera.

Figure 7:
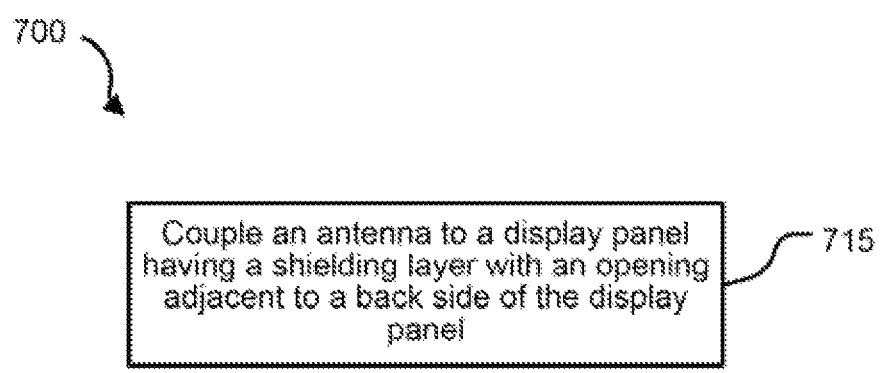
FIG. 7 is a flow diagram of an example method to making an apparatus or computing system for front-side wireless communication, in accordance with various implementations.

FIG. 7 is a flow chart depicting an example method 700 for making an apparatus or system configured for front-side wireless communication access from a front side a display panel in accordance with the various embodiments described herein.

Processing for the method 700 may include coupling an antenna to a display panel having a shielding layer with an opening adjacent to a back side of the display panel, at block 715, to allow for wireless communication from a front side of the display panel. In various examples, the antenna may be coupled so that the opening is between the antenna and the display panel. In other examples, the antenna may be coupled so that antenna is within the opening.

Figure 8:
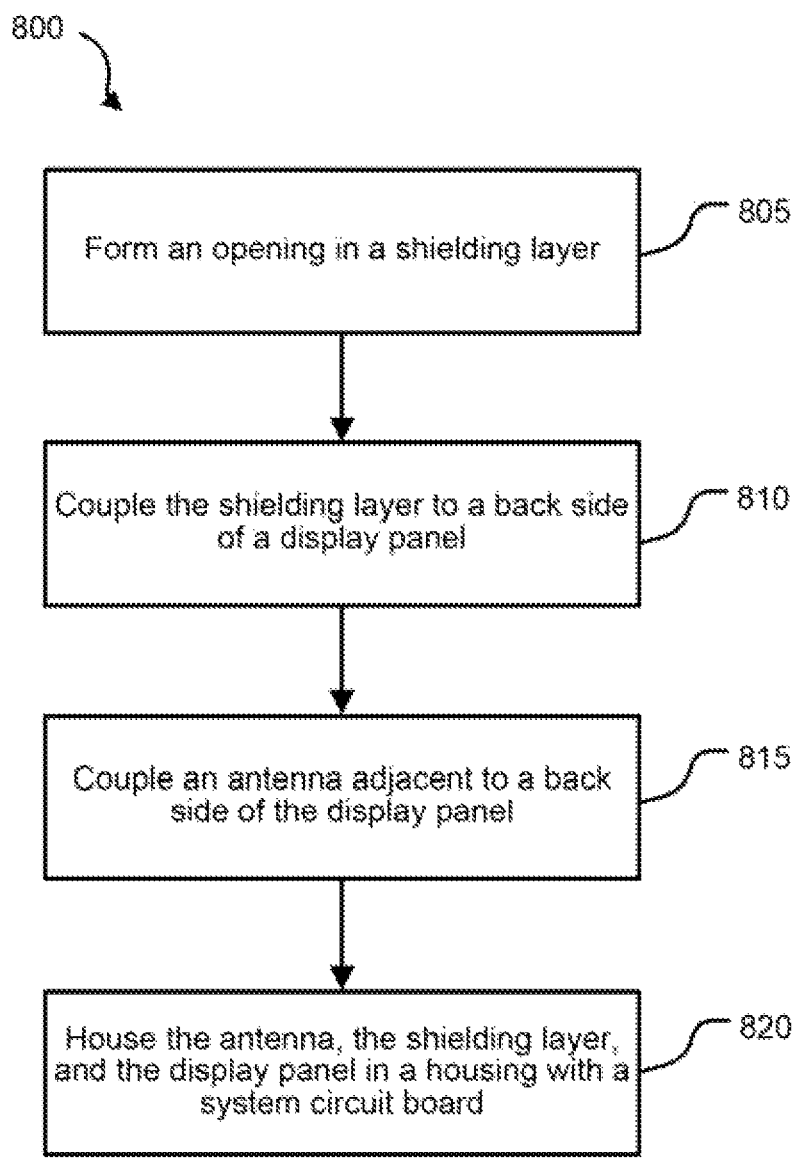
FIG. 8 is flow diagram of another example method for eking an apparatus or computing system for front-side wireless communication, in accordance with various implementations.

FIG. 8 is a Row chart depicting another example method 800 for making an apparatus or system configured for front-side wireless communication access from a front side a display panel in accordance with the various embodiments described herein. The method 800 may include one of more functions, operations, or actions illustrated by blocks 805, 810, 815, and/or 820.

Processing for the method 800 may include forming an opening in a shielding layer, at block 805, and then coupling the shielding layer to a back side of a display panel, at block 810. In other examples, the opening may be formed in the shielding layer after the shielding layer is coupled to the back side of the display panel. The opening in the shielding layer may be formed within a periphery of the shielding layer or along an edge of the shielding layer. The shielding layer may be coupled to the back side of the display panel using an adhesive, a frame along one more edges, or other suitable operation.

Processing for the method 800 may continue with coupling an antenna to the display panel having the shielding layer with the opening adjacent to the back side of the display panel, at block 815. In various examples, the antenna may be coupled so that the opening is between the antenna and the display panel. In other examples, the antenna may be coupled so that antenna is within the opening. In various examples, the antenna may be coupled to the shielding layer, to the back side of the display, or both.

Processing for the method 800 may continue with housing the antenna, the shielding layer, and the display panel in a housing with a system circuit board such that the antenna is between the system circuit board and the back side of the display panel, at block 820. In various examples, the system circuit board may be a motherboard, touch screen controller, or other circuit board. The system circuit board may be, for example, a printed circuit board, a flexible circuit, or another circuit substrate for mechanically supporting and/or electrically connecting electronic components by conductive pathways.

Venous aspects of the illustrative embodiments are described herein using terms commonly employed by those skilled in the art to convey the substance of their work to others skilled in the art. It will be apparent to those skilled in the art that alternate embodiments may be practiced with only some of the described aspects. For purposes of explanation, specific numbers, materials, and configurations are set forth in order to provide a thorough understanding of the illustrative embodiments. It will be apparent to one skilled in the art that alternate embodiments may be practiced without the specific details. In other instances, well-known features are omitted or simplified in order not to obscure the illustrative embodiments.

The phrases "in an example," "in various examples," "in some examples," "in various embodiments," and "in some embodiments" are used repeatedly. The phrases generally do not refer to the same embodiments; however, they may. The terms "comprising," "having," and "including" are synonymous, unless the context dictates otherwise. The phrase "A and/or B" means (A), (B), or (A and B), The phrase "A/B" means (A), (B), or (A and B), similar to the phrase "A and/or B".

The phrase "at least one of A, B, and C" means (A), (B), (C), (A and B), to and C), (B and C) or (A, B and C). The phrase "(A) B" means (B) or (A and B), that is, A is optional.

Although certain embodiments have been illustrated and described herein it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will ready appreciate that embodiments may be implemented in a wide variety of ways. This application is intended to cover any adaptations or variations of the embodiments discussed herein. It is manifestly intended, therefore, that embodiments be limited only by the claims and the equivalents thereof.

What is claimed is:

1. An apparatus comprising:
    a display panel;
    a shielding layer having an opening formed within a periphery of the shielding layer, the shielding layer adjacent to a back side of the display panel; and
    an antenna overlapping the opening, wherein the shielding layer is between the antenna and the display panel, and the antenna being adjacent to the back side of the display panel and not extending beyond an edge of the display panel to allow for wireless communication with the apparatus from a front side of the display panel, the antenna being larger than the opening and covering an entirety of the opening.

2. The apparatus of claim 1, wherein the display panel is a touch screen display panel.

3. The apparatus of claim 1, further comprising a touch sensor panel adjacent to the front side of the display panel.

4. The apparatus of claim 1, wherein the antenna is a near field communication antenna to allow for near field communication with the apparatus from the front side of the display panel.

5. The apparatus of claim 1, wherein the apparatus is a selected one of a desktop computer, a laptop computer, a handheld computer, a tablet computer, a netbook computer, a convertible computer, a display device, a server, a set-top box, a digital recorder, a game console, a smart phone, a personal digital assistant, a mobile phone, a digital media player, a television, or a digital camera.

6. The apparatus of claim 1, wherein the antenna further allows for wireless communication with the apparatus from the back side of the display panel.

7. The apparatus of claim 1 wherein the antenna is a radio interference shield between the display panel and a system circuit board.

8. The apparatus of claim 1, wherein the opening in the shielding layer provides a path through which the wireless communication with the apparatus from the front side of the display panel occurs.

9. A computing system comprising:
    a system circuit board;
    a display including a display panel and a shielding layer having an opening formed within a periphery of the shielding layer, the shielding layer adjacent to a back side of the display panel; and
    an antenna overlapping the opening, wherein the shielding layer is between the antenna and the display panel, and the antenna adjacent to the back side of the display panel, the antenna being physically disposed between the display and the system circuit board and not extending beyond an edge of the display panel to allow for wireless communication with the computing system from a front side of the display panel, and the antenna being larger than the opening and covering an entirety of the opening.

10. The computing system of claim 9, further comprising a housing to house the system circuit board, the display, and the antenna.

11. The computing system of claim 9, wherein the system circuit board is a motherboard.

12. The computing system of claim 9, wherein the display panel is a touch screen display panel, and wherein the system circuit board includes a touch screen controller.

13. The computing system of claim 9, wherein the computing system is a selected one of a desktop computer, a notebook computer, a handheld computer, a tablet computer, a netbook computer, a convertible computer, a display device, a server, a set-top box, a digital recorder, a game console, a smart phone, a personal digital assistant, a mobile phone, a digital media player, a television, or a digital camera.

14. The computing system of claim 9, wherein the antenna further allows for wireless communication with the computing system from the back side of the display panel.

15. A method for making an apparatus, comprising:
    forming an opening in a shielding layer, the opening formed within a periphery of the shielding layer; and
    coupling an antenna to a display panel having the shielding layer with the opening adjacent to a back side of the display panel, the shielding layer between the antenna and the display panel, the antenna not extending beyond an edge of the display panel, the opening being between the antenna and the display panel to allow for wireless communication with the apparatus from a front side of the display panel and the back side of the display panel, the antenna being larger than the opening and covering an entirety of the opening.

16. The method of claim 15, further comprising coupling the shielding layer to the back side of the display panel.

17. The method of claim 15, further comprising housing the antenna, the shielding layer, and the display panel in a housing with a system circuit board, the antenna being a radio interference shield between the system circuit board and the display panel.

* * * * *